United States Patent [19] [11] 3,887,578
Adembri et al. [45] June 3, 1975

[54] 1-AMINO-PYRAZOLIC DERIVATIVES
[75] Inventors: Giorgio Adembri; Piero Tedeschi; Fabio Ponticelli; Maresco Marini, all of Florence, Italy
[73] Assignee: Establissements Nativelle S.A., Paris, France
[22] Filed: Jan. 15, 1973
[21] Appl. No.: 323,605

[30] Foreign Application Priority Data
Jan. 14, 1972   United Kingdom............... 1864/72
Jan. 14, 1972   United Kingdom............... 1866/72

[52] U.S. Cl....... 260/310 A; 260/240 R; 260/240 A; 260/310 R; 424/273
[51] Int. Cl.............................................. C07d 49/04
[58] Field of Search................................. 260/310 A

[56] References Cited
UNITED STATES PATENTS
3,694,456   9/1972   Noguchi et al................. 260/310 R

*Primary Examiner*—Henry R. Jiles
*Assistant Examiner*—C. M. S. Jaisle
*Attorney, Agent, or Firm*—Sughrue, Rothwell, Mion, Zinn and Macpeak

[57] ABSTRACT
New 1-amino-pyrazolic derivatives of the formula (I):

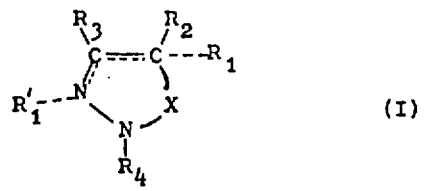

Where X represents one of the two following forms:

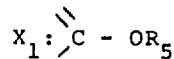

and $X_2$: $>C = 0$; $R_1$ and $R'_1$, which cannot exist at the same time, represent a hydrogen atom or a lower alkyl group. $R_2$ and $R_3$, which may be identical or different, represent a hydrogen atom, a lower alkyl group, a phenyl group, a phenyl group substituted by one of more lower alkyl groups, halogens, nitros, or lower alkoxys. $R_2$ may also be a benzylidene group (excluding the presence of $R_1$) when X is $X_2$. $R_4$ represents an amino group, possibly substituted by one or two identical or different lower alkyl groups or by a benzylidene-amino group. $R_5$ represents a hydrogen atom or a lower alkyl, as well as their salts with a mineral or organic acid.

A method for the preparation thereof, consisting essentially in internally transforming, in the presence of hydrazine, a 5-hydrazino isoxazole derivative which may be prepared in situ by causing a 5-halogeno isoxazole to react on hydrazine.

Pharmaceutical compositions containing said derivatives as an active constituent.

5 Claims, No Drawings

1-AMINO-PYRAZOLIC DERIVATIVES

The present invention relates to new 1-amino-pyrazolic derivatives corresponding to the general formula (I):

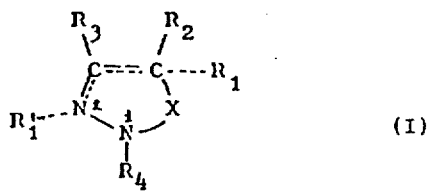

in which X represents one of the two following forms:

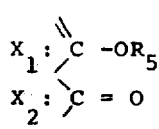

where $R_1$ and $R'_1$, which cannot exist at the same time, represent a hydrogen atom or a lower alkyl group. $R_2$ and $R_3$, which may be identical or different, represent a lower alkyl group, a hydrogen atom, a phenyl group, or a phenyl group substituted by one or more lower alkyl groups, halogens, nitros, or lower alkoxys. $R_2$ may also represent a benzylidene group (which excludes the presence of $R_1$) when X is $X_2$. $R_4$ represents an amino group, possibly substituted by one or two lower alkyl groups, or a benzylidene-amino group. $R_5$ represents a hydrogen atom or a lower alkyl group, as well as their salts with an organic or mineral acid.

It will be noted that $R_1$ and $R_2$ cannot exist in the presence of $X_1$, and in this case the pyrazolic ring comprises a double bond at 2.

The terms 'lower alkyl' and 'lower alkoxy' designate an alkyl or alkoxy group having 1 to 4 carbon atoms.

The invention also relates to a method for the preparation of derivatives of the general formula (I), consisting in causing a derivative of 5-hydrazino-isoxazole of formula (II):

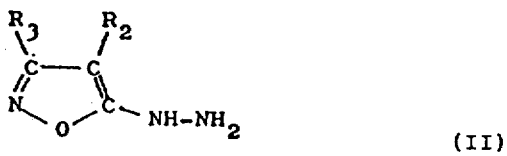

which may be prepared in situ from a 5-halogeno-isoxazole treated with hydrazine, to react on hydrazine. The products thus obtained may then be alkylated by an alkylation agent such as a diazoalkane, an alkyl halide or an alkyl sulfate.

The invention also relates to a method for preparing salts of derivatives of general formula (I). This method consists in causing the corresponding mineral or organic acids to act on these derivatives.

The invention also relates to the application, by way of a medicament, and more particularly a medicament having an anti-depressive, analgesic, anti-histaminic, and spasmolytic effect, of derivatives of general formula (I) and their pharmaceutically acceptable salts, as well as pharmaceutical compositions containing as an active constituent one or more of the products of general formula (I) and/or their pharmaceutically acceptable organic or mineral acid salts.

The compounds of formula (I) where X is $X_2$ and $R'_1$ is a hydrogen atom, are always in equilibrium with the corresponding enolic form:

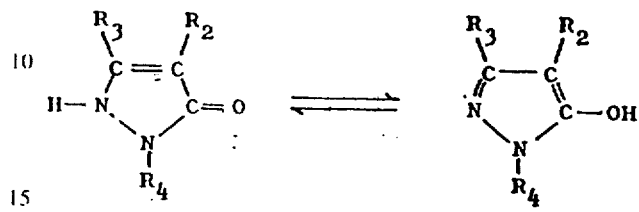

where $R_2$, $R_3$, and $R_4$ retain the above definitions.

Likewise, the compounds where X is $X_1$, and where $R_5$ represents a hydrogen atom, are in equilibrium with the corresponding ketonic form;

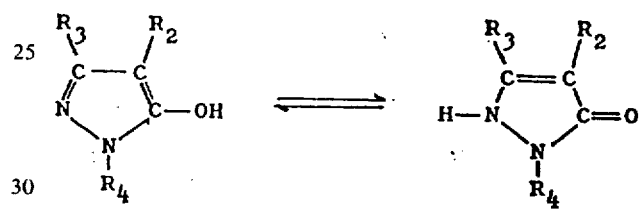

It may also be ascertained that, where X is $X_2$ and $R_5$ represents H, the compounds of formula (I) are the enolic forms of the corresponding compounds when X is $X_1$ and $R_1$ represents H.

The preparation of the compounds according to the present invention depends on the desired substituents $R_1$, $R_2$, $R_3$, $R_4$, and $R_5$.

a1. To prepare the compounds according to the general formula (I) containing $R'_1$ and $X_2$, in which $R'_1$ is H and $R_4$ is $NH_2$, a derivative of 5-hydrazino-isoxazole, with $R_2$ and $R_3$ as the suitable substituents, is treated with anhydrous hydrazine according to the following reaction:

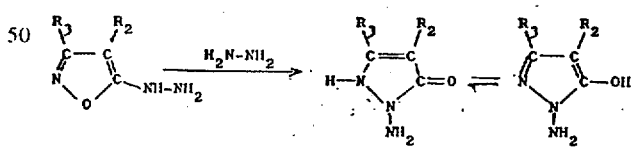

The 5-hydrazino-isoxazole may be prepared in situ by causing a 5-halogeno-isoxazole to react with anhydrous hydrazine.

Particularly advantageous conditions for the reaction are obtained by dissolving 1 mole of 5-hydrazino-isoxazole or of 5-halogeno- isoxazole, in a large quantity, preferably 20 - 30 moles, of anhydrous hydrazine, and by heating the solution for 2 - 4 hours at a temperature of 90°- 100°C.

a2. To prepare compounds according to the invention in conformity with the general formula (I) containing $X_1$, and in which $R_5$ is H and $R_4$ is $NH_2$, a suitable derivative of 5-hydrazino-isoxazole is treated according to the following reaction:

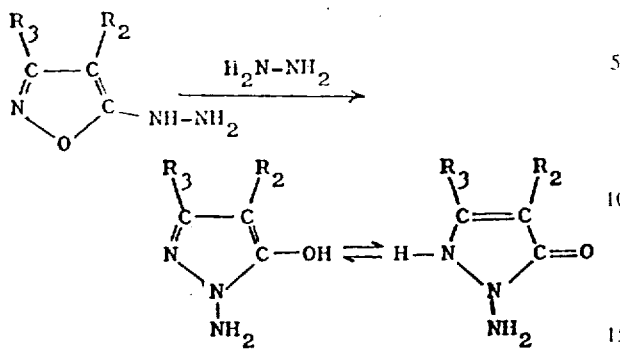

5-hydrazino-isoxazole may be prepared in situ by causing a 5-halogeno-isoxazole to react with anhydrous hydrazine.

The reaction is advantageously effected by dissolving 1 mole of 5-hydrazino-isoxazole in a large quantity, preferably 20 - 30 moles, of anhydrous hydrazine and by heating the solution for 2 to 2.5 hours at 90° - 100°C.

b1. The compounds according to the general formula (I), containing $R'_1$ and $X_2$, where $R'_1$ is a lower alkyl group and $R_4$ is $NH_2$, may be obtained from products prepared according to (a1), by causing these to react with a suitable diazoalkane. This partial alkylation is preferably obtained by dissolving 1 mole of 1-amino-5-pyrazolone, obtained according to (a1) in a small quantity of methanol, and by treating it with an excess amount (preferably 2 to 2.5 moles) of diazoalkane in ether or in an alcohol mixture.

b2. The compounds according to the general formula (I), containing $X_1$ and where $R_5$ is a lower alkyl group and $R_4$ represents $NH_2$, may be prepared from 5-hydroxy derivatives isolated from products of the reaction described in (a2), by alkylation with a suitable diazoalkane. Alkylation is preferably obtained by dissolving 1 mole of 1-amino-5-hydroxy-pyrazole in a very small amount of methanol and adding an excess amount, preferably 2 to 2.5 moles, of diazoalkane in an ether solution.

c1. The compounds according to the general formula (I) containing $R'_1$ and $X_2$, where $R_4$ represents an alkylamino group and where $R'_1$ represents a hydrogen atom, may be prepared from compounds obtained according to (a1) by alkylation in the presence of a suitable alkyl halogen or a suitable alkyl sulfate in a basic medium.

The reaction is preferably obtained by treating one mole of 1-amino-5-pyrazolone in an alcohol solution (preferably in a methanol or ethanol solution) with two moles of alkyl halide in the presence of 1.3 moles of sodium alcoholate, keeping the solution under reflux for 1 to 2 hours.

It is also feasible to treat one mole of an alkaline salt of 1-amino-5-pyrazolone in an alcoholic solution, with 4 moles of alkyl sulfate and 6 moles of an alkaline hydrate, keeping the solution under reflux at 60° - 80°C for 3 - 4 hours.

c2. The compounds according to the general formula (I) containing $X_1$, in which $R_5$ is an alkyl group and $R_4$ an amino group disubstituted by two identical or different alkyl groups, are prepared by alkylation of the compounds obtained according to (b2) by a suitable alkyl halide or dialkyl sulfate. The proportion of 1-amino-5-alkoxy-pyrazole to alkylation agent varies according to whether it is desired to produce di-alkylation of the nitrogen of the amino group bonded to the pyrazolic ring in position 1. If it is wished to obtain different alkyl groups as substituents on the nitrogen of the amino group, two different monoalkylations must be effected with different alkyl halides or sulfates.

Alkylation by alkyl halides is preferably effected by treating 1-amino-5-alkoxy-pyrazole in an alcoholic solution, with an alkyl halide in the presence of a sodium spirit, keeping the solution under reflux for 1 - 2 hours.

Alkylation by di-alkyl sulfates is preferably effected by treating 1-amino-5-alkoxy-pyrazole, in an alcoholic solution, with an excess amount of di-alkyl sulfate in the presence of an alkaline hydrate, under reflux, at 60° - 80°C, for 3 - 4 hours.

d. The compounds of the general formula (I), containing $X_2$ and $R_1$, where $R_4$ represents a possibly substituted amino group, are prepared by the same methods as those described for the preparation of compounds according to the general formula (I) containing $X_2$ and $R'_1$, but the operational conditions are modified as disclosed by the examples cited below.

e. The compounds according to the general formula (I) containing $R_1$ and $X_2$, where $R_4$ represents a benzylidene-amino, may be obtained by treating a 1-aminopyrazolone, such as obtained in (a1), (a2), (b2), or (d), by benzaldehyde. The reaction is preferably carried out in a small amount of a solvent such as methanol, heated in a water bath for ca. 1 hour.

The following examples illustrate the invention:

EXAMPLE 1

1-amino-3-phenyl-4-methyl-5-pyrazolone
$R_4 = NH_2$ ; $R_3 = C_6H_5$ ; $CH_3$; $R'_1 = H$ ; $X_2 = >C = O$ 10 g of 3-phenyl-4-methyl-isoxazolyl-5-hydrazine are treated with 50 ml anhydrous hydrazine, and the solution is heated for 3.5 hours at 90° - 100°C. The solution is then concentrated until a limited volume is obtained. It is then diluted with a little water and extracted with diethyl ether. The remaining aqueous phase is treated with active carbon.

After filtration, the solution is acidified to pH 5 - 6 with concentrated hydrochloric acid. the solution is then left in a refrigerator and 6 g of 1-amino-3-phenyl-4-methyl-5-pyrazolone are obtained. After recrystallization in water these have a melting point of 144° - 145° C (with decomposition).

| Analysis: $C_{10}H_{11}N_3O$ | | | |
|---|---|---|---|
| Calculated: | C 63.48% | H 5.86% | N 22.21% |
| Found | C 63.35% | H 5.88% | N 22.29% |

The structure of the product was confirmed by U.V., I.R. and N.M.R. spectra, which provided the following values:

U.V. $\lambda_{max}$ 250nm ($log \epsilon 4.12$) in methanol
I.R. $\nu$ CO 1710 cm$^{-1}$ (CHCl$_3$)
N.M.R. CH$_3$ 2.0 p.p.m.; C$_6$H$_5$ 7.2 - 7.7 p.p.m. (DMS d$_6$)

The following compounds were prepared by the same method:

1-amino-3-phenyl-5-pyrazolone, melting point: 159° - 160°C (decomposition)

1-amino-3-methyl-4-phenyl-5-pyrazolone, melting point: 176° - 177°C (decomposition)

EXAMPLE 2

1-amino-2,4-dimethyl-3-phenyl-5-pyrazolone
$R_4 = NH_2$ ; $R_3 = C_6H_5$ ; $R_2 = CH_3$ ; $R'_1 = CH_3$ ; $X_2$ 5g of 1-amino-3-phenyl-4-methyl-5-pyrazolone obtained as described in Example 1, are dissolved in methanol and treated with 2.5 g diazomethane in an alcohol-ether solution. After allowing the solution to stand overnight, the solvent is evaporated and the remaining oil is recovered with ether. 1.5 g of 1-amino-2,4-dimethyl-3-phenyl-5-pyrazolone are obtained. After recrystallization in benzene, the product has a melting point of 155° – 157°C.

Analysis: $C_{11}H_{13}N_3O$

| | | | |
|---|---|---|---|
| Calculated: | C 65.01% | H 6.45% | N 20.67% |
| Found | C 65.19% | H 6.55% | N 20.71% |

The values of the U.V. and I.R. spectra are the following:
U.V. $\lambda_{max}$ 246 nm (log. 4.05) in methanol.
I.R. $\nu$ CO 1665 cm$^{-1}$ (Nujol)

The structure was also confirmed by de-amination with $HNO_2$ to give 5-phenyl-1,4-dimethyl-5-pyrazolone.

The following compound was prepared by the same method: 1-amino-2,3-dimethyl-4-phenyl-5-pyrazolone monohydrate. Melting point: 143° – 144°C (decomposition).

EXAMPLE 3

1-methylamino-3-methyl-4-phenyl-5-pyrazolone
$R_4 = NHCH_3$ ; $R_3 = CH_3$ ; $R_2 = C_6H_5$ ; $R'_1 = H$ ; $X_2$ 1.5 g of 1-amino-3-methyl-4-phenyl-5-pyrazolone, obtained as described in Example 1, are dissolved in a solution of 0.25 g of sodium in 10ml of methanol. 2.3 g methyl iodide are then added. The solution is then heated under reflux for 1.5 hours. After evaporation of the solvent, a thick residue is obtained. This is recovered and concentrated with a concentrated sodium hydroxide solution. 0.7 g of a sodium salt is obtained. This is dissolved in a small amount of water. The solution is acidified with concentrated hydrochloric acid to a pH 5 – 6. The acid solution is then extracted with ether. After evaporating the ether, 1-methylamino-3-methyl-4-phenyl-5-pyrazolone is obtained. This contains one molecule of crystallization water.

After recrystallization in a benzene-ligroin mixture, the product obtained has a melting point of 142° – 143°C.

Analysis: $C_{11}H_{13}N_3O$, $H_2O$

| | | | |
|---|---|---|---|
| Calculated: | C 59.71% | H 6.83% | N 18.99% |
| Found | C 59.82% | H 6.67% | N 18.94% |

EXAMPLE 4

1-amino-3-phenyl-4-methyl-5-methoxy-pyrazole
$R_4=NH_2$; $R_3=C_6H_5$ ; $R_2 = CH_3$ ; $R_1 = H$ ; $X_1$.

10 g of 3-phenyl-4-methyl-isoxazolyle-5-hydrazine are treated with 50 ml anhydrous hydrazine, and the solution is heated for 3 hours. The solution is concentrated until a limited volume is obtained. It is then diluted with water and extracted with ether. The aqueous stage is treated with active carbon. It is filtered and acidified to a pH 5 – 6 with concentrated hydrochloric acid. It is allowed to stand in the refrigerator and 6 g of 1-amino-3-phenyl-4-methyl-5-hydroxy-pyrazole is obtained. This is recovered with methanol and treated with 2.5 g diazomethane in an ether-alcohol solution.

After evaporation of the ethereal solution, a residue is obtained which is extracted repeatedly when heated, with ligroin. After decanting and cooling the solution, 1-amino-3-phenyl-4-methyl-5-methoxy-pyrazole is obtained. After crystallization in the ligroin and purification by sublimation in a vacuum, the product has a melting point of 92° – 94°C.

Analysis: $C_{11}H_{13}N_3O$

| | | | |
|---|---|---|---|
| Calculated: | C 65.01% | H 6.45% | N 20.67% |
| Found | C 65.28% | H 6.50% | N 20.96% |

The following compounds are prepared by the same method:

1-amino-3-phenyl-5-methoxy-pyrazole, melting point: 158° – 160°C.

1-amino-3-methyl-4-phenyl-5-methoxy-pyrazole, melting point: 93° – 94°C.

EXAMPLE 5

1-benzylideneamino-3-methyl-4-phenyl-5-pyrazolone
$R_4 = N=CH-C_6H_5$ ; $R_3 = CH_3$ ; $R_2 = C_6H_5$ ; $R_1 = H$ ; $X_2$.

0.01 mole of 1-amino-3-methyl-4-phenyl-5-pyrazolone is dissolved, cold, in a small amount of methanol. 0.02 mole of benzaldehyde are added. The solution is heated in a water bath for one hour. After cooling adding a little water, the precipitate of 1-benzylideneamino-3-methyl-4-phenyl-5-pyrazolone is obtained. This is recrystallized twice in a water-alcohol mixture.

The melting point of this product is 93° – 95° C.

The following products are prepared by the same method:

1-benzylideneamino-3-phenyl-4-methyl-5-pyrazolone, Melting point 93° – 95°C.

1-benzylideneamino-3-phenyl-4-phenyl-5-pyrazolone, Melting point 112° – 115°C.

EXAMPLE 6

1-benzylideneamino-3-phenyl-4-benzylidene-5-pyrazolone
$R_4 = N=CH-C_6H_5$ ; $R_3 = C_6H_5$ ; $R_2 = =CHC_6H_5$ ; $X_2$.

1.21 g benzaldehyde are added to 1 g of 1-amino-3-phenyl-5-pyrazolone in glacial acetic acid. The reaction mixture is kept under reflux for 1 hour. After cooling, the raw product (1.3 g, yield 65%), is filtered, dried in a vacuum and recrystallized in ethyl acetate to provide a compound in the form of red crystals having a melting point of 220° – 222°C.

Analysis: $C_{23}H_{17}N_3O$

| | | | |
|---|---|---|---|
| Calculated: | C 78.61% | H 4.88% | N 11.96% |
| Found | C 78.27% | H 4.85% | N 11.79% |

I.R. spectrum $\nu$ CO 1690 cm$^{-1}$ (nujol)

PHARMACOLOGICAL STUDY

The products according to the present invention have a depressive effect on the central nervous system. This depressive effect is manifested by a sedative and myorelaxant action. These products also have analgesic, anti-histaminic and spasmolytic effects.

The study showed, for example, that the product 1-amino-2,4-dimethyl-3-phenyl-5-pyrazolone has a sedative action approximately ten times longer than that of Meprobamate. It also has a myorelaxant action which is 3 times greater than the corresponding Meprobamate action.

Furthermore, the toxicity of this compound is low. The average lethal dose ($LD_{50}$) is ca. 1000 mg/kg (intreperitoneal injection in mice). As a result of its solubility, this product may be injected peritoneally and also absorbed orally.

The study of the product 1-amino-3-phenyl-5-methoxypyrazole, which was also carried out on mice, rats, and dogs, produced similar effects (a depressive action on the central nervous system, consisting in a sedative, myorelaxant, and anticonvulsive effect). This product also has a more marked spasmolytic effect.

The average lethal dose taken orally by mice is also 1000 mg/kg.

PHARMACEUTICAL COMPOSITIONS

The new compounds according to the present invention may be administered in the conventional ways: orally, peritoneally, rectally, diluted in supports utilized in the pharmaceutical field, for example, in the form of gels, capsules, compressed tablets, pills, sirups, emulsions, solutions, injections and suppositories.

Lactose, amidon, polyvinylpyrrolidone, magnesium stearate, talc, microcrystalline, cellulose, and/or carboxymethylcellulose, may be used as solid diluents for the preparation of the compressed taplets.

Bi-distilled water, a mixture of bi-distilled water and propyleneglycol, and propylene glycol may be used as diluents in the preparation of injectable solutions.

The following compounds are particularly suitable for use as solid diluents in the preparation of suppositories: triglycerides, saturated fatty acids, cocoa butter and polyethyleneglycol.

All formulations suitable for these administration methods, may be used. The medicament is used as an active constituent with a pharmaceutically acceptable vehicle.

The following formulations are provided by way of example as being suitable for the preparation of compressed tablets:

| | | |
|---|---|---|
| A. | 1-amino-3-phenyl-4-methyl-5-pyrazolone | 100 mg |
| | Lactose | 90 mg |
| | Amidon | 60 mg |
| | Microcrystalline cellulose | 10 mg |
| | Polyvinylpyrrolidone | 5 mg |
| | Talc | 3 mg |
| | Magnesium Stearate | 2 mg |
| B. | 1-amino-3-phenyl-4-methyl-5-methoxy-pyrazole | 100 mg |
| | Lactose | 100 mg |
| | Amidon | 60 mg |
| | Polyvinylpyrrolidone | 8 mg |
| | Talc | 4 mg |
| | Magnesium stearate | 3 mg |

The following are suitable formulations for preparing injectable solutions:

| | | |
|---|---|---|
| A1 | 1-amino-3-phenyl-4-methyl-5-pyrazolone | 50 mg |
| | Bi-distilled water q.s.p. | 3 ml |
| | pH of the solution 8.0 | |
| A2 | 1-amino-3-phenyl-4-methyl-5-pyralozone | 50 mg |
| | Propylene glycol | 0.5 ml |
| | Bi-distilled water q.s.p. | 1.5 ml |
| | pH of the solution 6.5 | |
| B1 | 1-amino-3-phenyl-4-methyl-5-methoxy pyrazole | 50 mg |
| | Propylene glycol | 1 ml |
| | Bi-distilled water (sterile and apyrogenic) q.s.p. | 2 ml |
| | pH of the solution 5.7 | |
| B2 | 1-amino-3-phenyl-4-methyl-5-methoxy-pyrazole | 200 mg |
| | Benzyl alcohol | 0.1 ml |
| | Peanut oil q.s.p. | 2 ml |

The following may be used in the preparation of suppositories:

| | | |
|---|---|---|
| A | 1-amino-3-phenyl-4-methyl-5-pyrazolone | 100 mg |
| | Triglycerides of saturated fatty acids q.s.p. | 1.5 g |
| B | 1-amino-3-phenyl-4-methyl-5-methoxy pyrazole | 50 mg |
| | Triglycerides of saturated fatty acids q.s.p. | 1.5 g |

We claim:

1. A 1-amino-pyrazole compound of the formula:

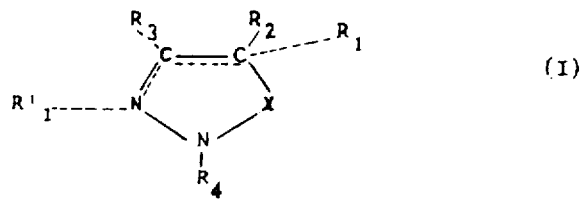

which X represents one of the two following forms:

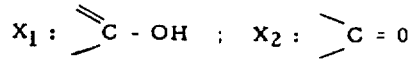

wherein $R_1$ and $R'_1$, which cannot exist at the same time, represent a hydrogen atom or a lower alkyl group having 1 to 4 carbon atoms; $R_2$ and $R_3$, which may be identical or different represent a hydrogen atom, a lower alkyl group, a phenyl group, a phenyl group substituted by one or more groups selected from lower alkyl, halogen, nitro and lower alkoxy; $R_4$ represents an amino group, a mono-lower alkyl amino group or a di-lower alkyl amino group; or a pharmaceutically acceptable salt thereof with a mineral or organic acid.

2. A compound as defined in claim 1 in the form of a pharmaceutically acceptable mineral or organic acid salt.

3. A compound as defined in claim 1, in the form of a monohydrate.

4. A compound as defined in claim 1 wherein said compound is: 1-amino-2,4-dimethyl-3-phenyl-5-pyrazolone.

5. A compound as defined in claim 1 wherein said compound is: 1-amino-2,3-dimethyl-4-phenyl-5-pyrazolone.

* * * * *